United States Patent [19]

Khan

[11] 3,776,242
[45] Dec. 4, 1973

[54] COMBINATION THRESHING AND SEPARATING MACHINE
[75] Inventor: Amir U. Khan, Okemos, Mich.
[73] Assignee: The United States of America as represented by the Secretary of Agriculture, Washington, D.C.
[22] Filed: Nov. 26, 1971
[21] Appl. No.: 202,119

[30] Foreign Application Priority Data
Dec. 2, 1970   Philippines.............................. 12001

[52] U.S. Cl. .............................. 130/27 T, 130/27 Q
[51] Int. Cl. ............................................. A01f 12/20
[58] Field of Search ............. 130/27 T, 27 M, 27 Q, 130/27 Z, 27 AD, 27 R, 27 H, 27 HF

[56] References Cited
UNITED STATES PATENTS
| 3,179,111 | 4/1965 | Morrison et al. | 130/27 Q |
| 1,374,518 | 4/1921 | Oda | 130/27 Q |
| 953,833 | 4/1910 | Hollingsworth | 130/27 T |
| 831,420 | 9/1906 | Dunkelberger | 130/27 HF |
| 3,425,423 | 2/1969 | McKenzie | 130/27 T |
| 2,698,039 | 12/1954 | Pritchett | 130/27 M |

Primary Examiner—Antonio F. Guida
Attorney—R. Hoffman et al.

[57] ABSTRACT

This invention relates to a combined threshing machine and rotary separator for grain crops. The threshing and separator sections are disposed in axial alignment, with the proximal ends in substantial overlapping relation. Straw disposal means is located adjacent the distal end of the rotary separator section. Grain is removed on a conveyor at the bottom of the threshing section adjacent the proximal end of the separator. A blower is located below the conveyor outlet. The rotary separator section comprises three concentric cylindrical shells rigidly connected together for unitary rotation, the innermost shell being wholly perforated and provided with tumbling louvers on its inner surface. The intermediate shell is partially perforated and provided with deflecting louvers oriented to move threshed materials towards the perforated portion. The outermost shell is imperforate and has louvers on its inner surface oriented to move grains towards the blower and the grain trough disposed below the bottom side of the end of the outermost shell adjacent to the blower.

5 Claims, 8 Drawing Figures

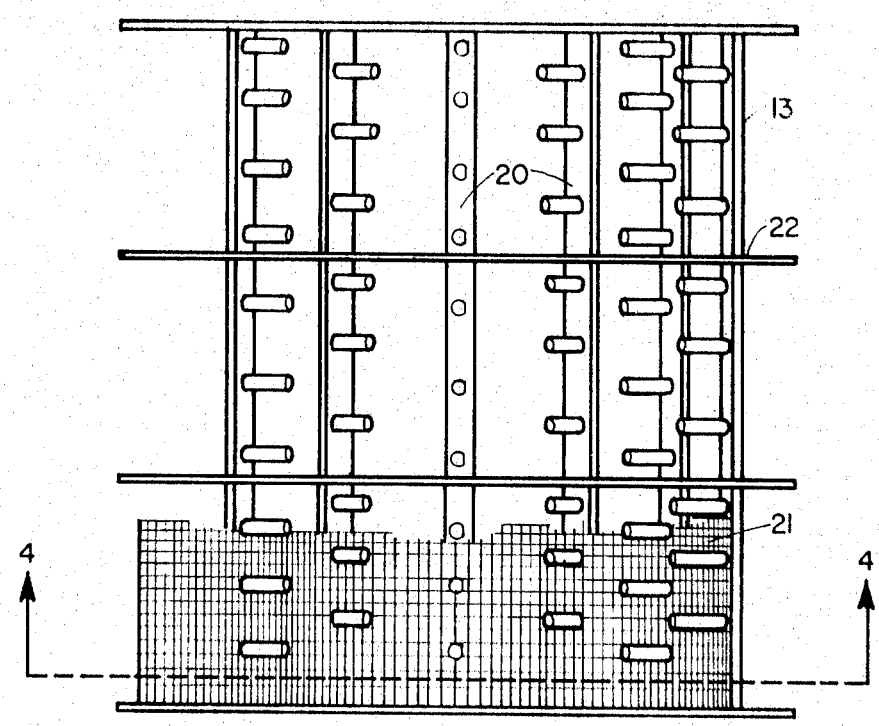
FIG. 3
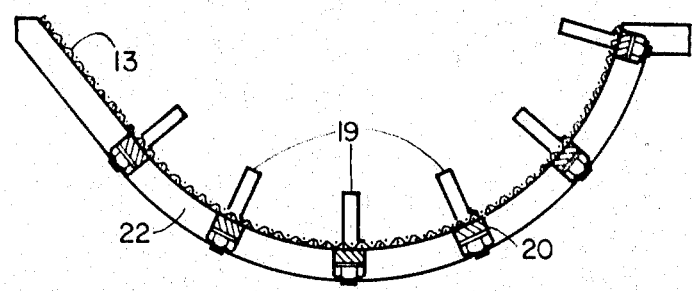
FIG. 4
     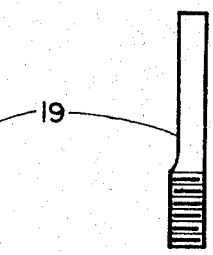          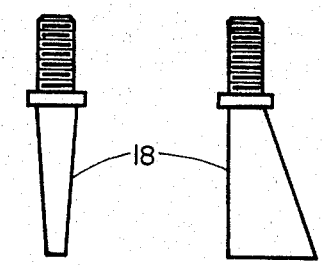  
FIG. 5     FIG. 6          FIG. 7     FIG. 8

COMBINATION THRESHING AND SEPARATING MACHINE

A nonexclusive, irrevocable, royalty free license in the invention herein described, throughout the world for all purposes of the United States Government, with power to grant sublicenses for such purposes, is hereby granted to the Government of the United States of America.

The present invention relates to agricultural machines and more particularly to a throw-in type thresher wherein there is combined with the rotary threshing drum a grain separator unit comprising a series of concentric cylinders from which the grains are progressively separated from the straws and the impurities.

Generally, a throw-in type thresher is a machine which comprises a revolving cylinder or drum and a curve concave steel grille, hereinafter referred to simply as the "concave." The bundles of rice-containing-straw are fed into the drum where the beating action of the drum and concave detach the grain from the panicle. A major portion of the grain falls through the opening in the concave while the straw is discharged into the separating section. The grain left with the straw is separated on a straw walker. The threshed grain is then screened in a series of sieves and finally winnowed by a blower.

In conventional throw-in type threshers, the rotary threshing drum and concave eject the threshed straw in a radial direction on the straw walkers. The duration of threshing cannot be controlled since the crop passes through the threshing cylinder in one pass. Often with crops which are difficult to thresh or are too wet, the threshing is not complete. This results in high threshing losses or large amounts of tailings which need to be re-threshed.

The tailings from commonly used throw-in threshers are recycled for additional threshing. The tailings comprise grain that is not completely threshed from the panicles. To convey the tailings to the main threshing drum requires a conveyor which is expensive. Furthermore, by returning the tailings to the main threshing drum, an additional load is placed thereon which reduces its capacity.

The throw-in type thresher to which the invention relates comprises a threshing section and a separating action. The threshing section is formed by a rotatable horizontal threshing drum cooperating with a concave and a metal casing that is provided with a plurality of adjustable louvers. Because of this novel arrangement, the position of the adjustable louvers can be changed to vary the duration of threshing for different kinds and conditions of crops. Thus very dry or easily threshable crops can be treated satisfactorily with the maximum helical position thereby passing the crops through the threshing cylinder in one pass. Crops which are difficult to thresh are treated with the louvers adjusted nearly transverse to the threshing drum which moves the crop spirally through the concave area thereby accomplishing multipass threshing.

The separating section comprises a series of concentric cylindrical screens with material for separation being delivered on the inside of the innermost cylinder. According to the arrangement, vigorous tumbling of the straw in the innermost cylinder loosens the grain from the straw and it falls through the perforations into the intermediate cylinder. This grain, including that which was removed through the concave at the threshing cylinder, is moved axially until it reaches the screen portion where it falls through the perforations therein and is caught by the outermost cylinder and swept against the flow of air from the blower until it falls into the grain trough from which it is elevated and discharged to any kind of container.

It is an object of this invention to provide an effective means for the separation of grain from straw, especially when threshing wet crops, through the rotary separating unit without a clogging or choking action and thus overcome one of the main defects in previous threshers.

Another object of the invention is to provide a simple, compact, one piece rotary separating cleaner to eliminate the bulky straw walker and cleaning sleeve used with conventional thresher and combines.

Still another object of this invention is to provide a threshing machine that provides a control on the threshing action of a cylinder by changing the number of times the same material is threshed at the concave.

A further object of the invention is to construct a thresher which will be much lighter in weight to permit improved accessibility under different field conditions and to permit direct, three point linkage mounting to a tractor.

The manner of accomplishing the foregoing objects, as well as further objects and advantages will be made manifest in the following description taken in connection with the accompanying drawings in which:

FIG. 3 is a top view of the concave;

FIG. 4 is a cross-sectional view of the concave along lines 4—4 on FIG. 3;

FIG. 5 is a front elevational view of one of the teeth of the concave;

FIG. 6 is a side elevational view of the tooth shown in FIG. 5;

FIG. 7 is a side elevational view of the threshing blade looking in the direction of rotation;

FIG. 8 is another elevational view of the blade shown in FIG. 7;

For purposes of this specification, the end of the threshing machine connected to the power take off of the tractor will be considered as the front thereof.

Figure 1:
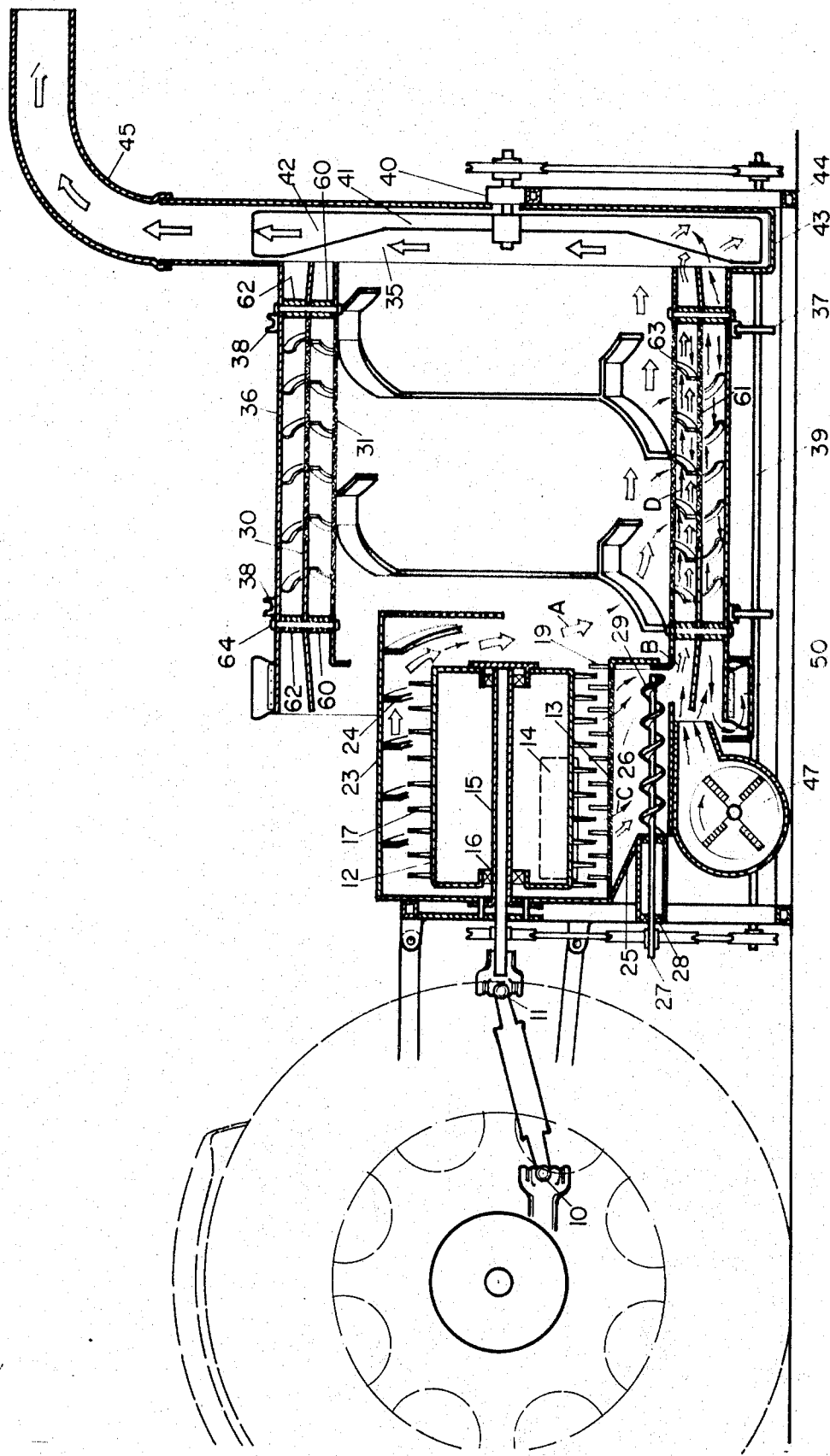
FIG. 1 is a schematic longitudinal section of the machine.

Referring now particularly to FIG. 1, the threshing machine chosen for illustrative purpose is adapted to be attached to a tractor and could be mounted on a trailer or could be adapted into a combine with the addition of a suitable loader. More specifically, a power-take-off (PTO) shaft 10 extends rearwardly from the tractor and provides power to the thresher by means of universal joint 11.

The thresher has a main threshing cylinder 12 and a concave 13 between which is fed at 14 the crop material. A cantilevered shaft 15 mounted on suitable bearings 16 support the threshing cylinder. The threshing cylinder is studded with a plurality of threshing blades 17 constructed and arranged in a special manner. The blade face 18 towards the direction of rotation is flat and tapers upwardly (FIG. 7) whereas the side along the direction of rotation is expanded to resemble a paddle and tapers toward the base (FIG. 8). The blades are arranged in a plurality of longitudinal and radial rows so that each blade on the longitudinal row lies adjacent the center of the axial space between the blades of adjacent radial row. The construction and the staggered arrangement of the blades eliminate the accumulation of straw and the subsequent clogging of the threshing section The thresing drum 12 operated in conjunction with a concave 13 comprising a series of spaced apart stud bolts 19 arranged substantially parallel to the threshing blades (FIGS. 3 & 4). The stud bolts are supported rigidly at their lower ends by longitudinal plates 20 and provided with a plurality of rods 21 which are closely spaced but allow the passing of threshed materials through the spaces between the rods. The rods are further supported by a plurality of transverse plates 22. The stud bolts 19 are largely chipped away on the side facing against the rotation of the threshing drum (FIG. 5 & 6).

A casing 23 with adjustable deflecting fins 24 is provided on the upper portion of the threshing section. The fins 24 are planiform metal sheets and are distributed at the central top portion of the casing so that an operator by adjusting the angle of fins with respect to the threshing drum axis can regulate the degree of threshing for a particular crop condition. The fins 24 may be adjustably mounted in the casing in any conventional manner.

The converging sides 25 are largely cut away to provide an auger trough 26. Shaft 27 mounted on suitable bearings 28 and with helical blades 29 therearound conveys the grains collected at the trough 26 into the intermediate cylinder 30 for cleaning (to be discussed hereinafter).

Figure 2:
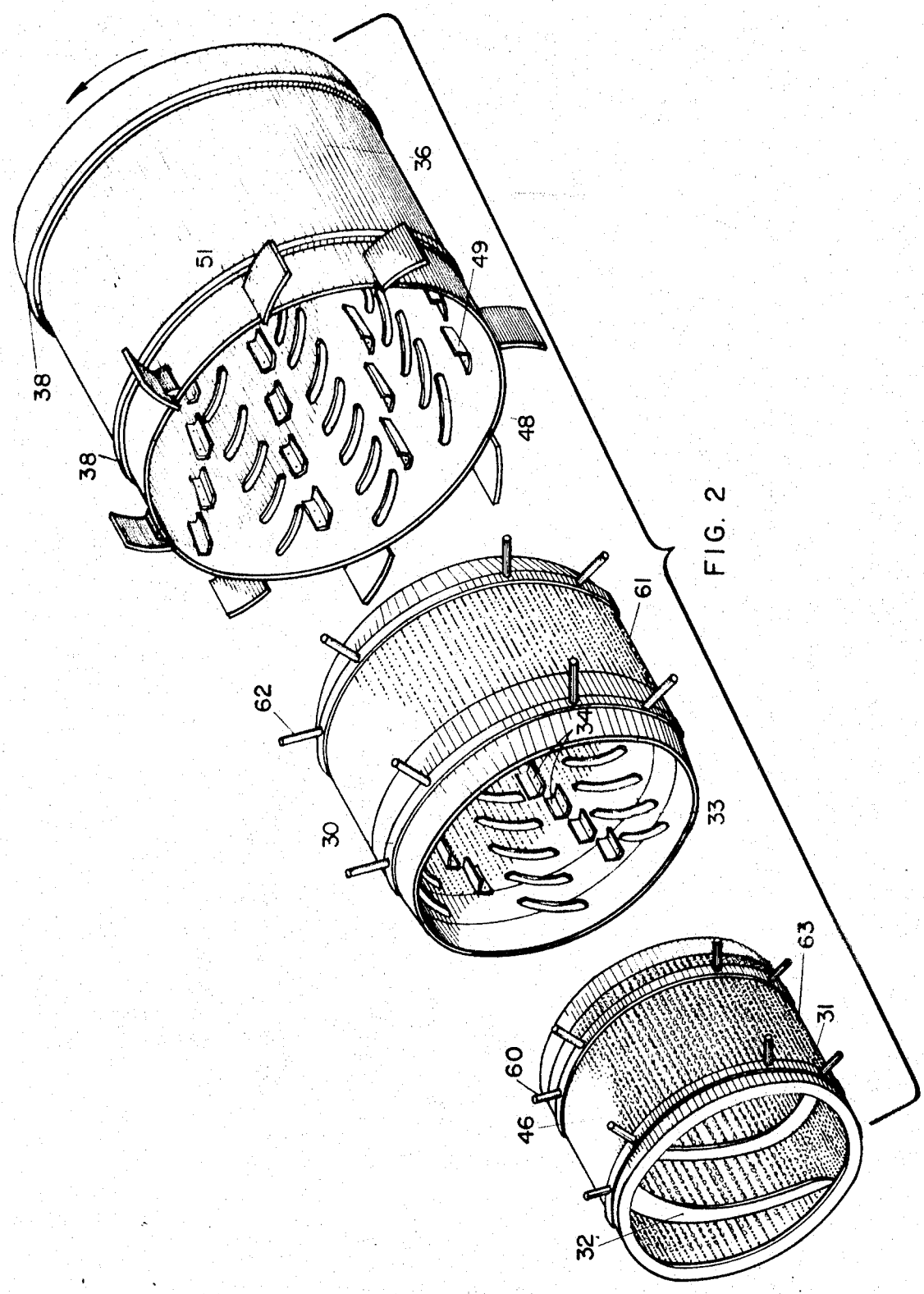
FIG. 2 is an exploded view of the separating section.

Disposed forwardly of the threshing drum in axial alignment and in substantially overlapping relation therewith is the grain separator section which includes three concentric cylindrical shells. The innermost cylindrical shell 31 shown on FIG. 2, is perforated and provided on the inner surface thereof with tumbling louvers 32 which tumble and turn vigorously the straws to remove the remaining grains carried therewith. The inner cylindrical shell is wholly perforated, perforations 63 extending all over substantially the middle portion thereof. On the outer surface of the cylinder are a plurality of spacer tubes 60.

Concentric with the innermost shell is another perforate cylindrical shell 30. However in this shell, the perforations 61 are only along the middle forward half portion thereof, as shown in FIG. 1, and also this shell is provided with deflecting louvers 33 and a plurality of baffles 34 on the inner surface thereof and on the outer surface thereof with a plurality of spacer tubes 62. The spiral louvers 33 and the baffles 34 deliver the straws axially to the straw thrower 35.

A third concentric shell 36 serves as the casing for the grain separator section and to this outermost shell the intermediate and innermost shells are rigidly connected for unitary rotation by the several bolts 62 inserted through suitable holes provided in the cylindrical shell s and through spacer tubes 60 and 62. The shell 36 is supported conventionally by pairs of rollers (not shown) at the bottom and further provided with annular tracks 38 for receiving belts (not shown) which go around pulleys 37 keyed on shaft 39 to provide rotation to said separator section upon rotation of shaft 39. The conventional rollers (not shown) which support the outermost shell 31 are disposed inwardly of rollers 37.

A paddle type straw thrower 35 is provided at the rear end of the grain separator section. This thrower is in the form of a centrifugal blower type fan and casing. The fan, mounted on shaft 40, is of the impeller type and comprises a series of radial arms 41 to which are bolted the straw engaging paddles 42. A circular casing 43 surrounds the fan and is secured to the thresher chassis 44 in any suitable manner. The spout 45 extends tangentially from the fan casing 40 and is in straw receiving communication therewith to receive straw delivered by the paddle 42 and convey same a short distance away from the thresher.

In field operation, the materials to be threshed is fed into the entrance 14, and the cylinder-and-concave assembly threshes the grains from the panicle. A major portion of the threshed grains with some chaff and impurities pass through the concave 13 into the auger trough 26 whereas the straws are delivered into the rotary screen separator.

Inside the innermost shell 31, the straw is vigorously turned and tumbled. This vigorous shaking and tumbling movement removes grains remaining on the straws which falls through the perforate wall portion 46 into the intermediate cylinder 30 while the straw is axially moved to the straw thrower 35.

The grains from the innermost shell 31 mixes with the grain separated at the concave 13 in the annular clearance between shells 30 and 31. The combination of louvers 33 and fins 34 turbulently agitate the grains while being subjected to the stream of air provided by blower 47. The blower 47 is disposed below the grain trough 26 rearwardly of the discharge opening thereof, and rearwardly of the bottom side of the rotary grain separator section to a discharge a stream of air axially into the rear of the spaces between the innermost cylinder and the intermediate cylinder and between the intermediate cylinder and the outermost cylinder or casing. The rear half portion of the intermediate shell is not perforated to provide sufficient exposure of the grains to the stream of air for efficient cleaning of the grains from impurities. The lighter-than-grain impurities are blown into the straw thrower 35 whereas the clean grains fall into the outermost cylinder 36 of the rotary screen separator. The special arrangement of louvers 48 in the outermost cylinder move the grain into the trough 50 while baffles 49 move the straw towards straw thrower 35. Elevating members 51 preferably made of flexible materials are disposed on the outer rear end surface of the outermost shell 36 and adapted to move along the arcuate trough 50 disposed below the lower rear end side of said outermost shell 36 to convey the clean grains into container (not shown) for eventual storage, through a suitable discharge opening (not shown) provided on said arcuate trough 50.

As shown in FIG. 1, the bulk of the straw follows the general direction indicated by the large light arrows A, while the chaff and small light material follow the general direction indicated by the small light arrows B. The general direction followed by the grains is indicated by the black arrows C with plain shafts, while the general direction of the stream of air from the blower is indicated by the black arrows D with crooked shafts.

While a preferred embodiment of the invention has been described above, it will be understood that this embodiment is illustrative only and that various modifications may be resorted to without departing from the spirit of the appended claims.

I claim:

1. A threshing machine comprising:
   a. a chassis;
   b. a threshing section mounted on said chassis, said threshing section including a casing provided on the inner upper portion thereof with a plurality of deflecting fins, a threshing drum horizontally disposed withi said casing, a concave with a plurality of stud bolts disposed below said threshing drum, and a grain conveyor means below said concave and said casing;
   c. a rotary separator section mounted on said chassis forwardly of said threshing section and in axial alignment therewith, the adjacent ends of said rotary separator section and said threshing section being in substantial overlapping relation, said rotary separator section including at least three spaced apart concentric cylindrical shells rigidly connected together for unitary rotation;
   d. straw disposal means disposed forwardly of said rotary separator means, said straw disposal means having a casing with a spout communicating with said rotary separator section and a fan disposed within said casing; and
   e. blower means disposed below said grain conveyor means of said threshing section to provide a stream of air through the rear of the spaces between said concentric cylindrical shells of said rotary separator section.

2. A threshing machine as in claim 1 wherein the innermost of said concentric cylindrical shells of said rotary separator section is perforated and said innermost cylindrical shell has a plurality of spiral louvers secured in the inner surface thereof.

3. A threshing machine as in claim 2 wherein the intermediate of said concentric cylindrical shells has an imprerforate rear portion and a wholly perforate forward portion, said intermediate cylindrical shell having a plurality of spiral louvers in the inner side thereof to convey straws and impurities axially outwardly upon rotation thereof.

4. A threshing machine as in claim 3 wherein the outermost of said concentric cylindrical shells is imperforate, said outermost cylindrical shell having on the inner side thereof a plurality of spiral louvers and at the rear of the outer side thereof, are uniformly disposed a plurality of elevating flaps said outermost cylindrical shell having further on the outer side thereof annular tracks connected to a power transmission means, and an arcuate trough disposed below the lower rear end of said outermost cylinderical shell along which said elevating flaps travel to convey grains towards the discharge side of said trough.

5. A threshing machine as in claim 4 wherein said fan of said straw disposal means includes radial arms having straw engaging paddles at the end portions thereof.

* * * * *